(12) United States Patent
Lutz et al.

(10) Patent No.: US 8,088,245 B2
(45) Date of Patent: Jan. 3, 2012

(54) STRUCTURAL EPOXY RESINS CONTAINING CORE-SHELL RUBBERS

(75) Inventors: Andreas Lutz, Gulgenen (CH);
Jeannine Fluekiger, Pfaffikon (CH);
Cathy Grossnickel, Schubelback (CH)

(73) Assignee: Dow Global Technologies LLC, Midland, MI (US)

( * ) Notice: Subject to any disclaimer, the term of this patent is extended or adjusted under 35 U.S.C. 154(b) by 768 days.

(21) Appl. No.: 12/099,856

(22) Filed: Apr. 9, 2008

(65) Prior Publication Data

US 2008/0251203 A1 Oct. 16, 2008

Related U.S. Application Data

(60) Provisional application No. 60/922,878, filed on Apr. 11, 2007.

(51) Int. Cl.
*C04B 37/00* (2006.01)
*C09J 163/00* (2006.01)
*C08F 8/30* (2006.01)
*C08L 75/00* (2006.01)

(52) U.S. Cl. .......................... 156/325; 156/330; 525/124

(58) Field of Classification Search .................. 156/325, 156/330; 525/124
See application file for complete search history.

(56) References Cited

U.S. PATENT DOCUMENTS

| | | | |
|---|---|---|---|
| 4,931,482 A | 6/1990 | Lamberts | |
| 5,202,390 A | 4/1993 | Mulhaupt | |
| 5,278,257 A | 1/1994 | Mulhaupt | |
| 5,290,857 A | 3/1994 | Ashida | |
| 5,686,509 A | 11/1997 | Nakayama | |
| 6,776,869 B1 | 8/2004 | Schenkel | |
| 6,884,854 B2 | 4/2005 | Schoenfeld | |
| 2003/0190478 A1* | 10/2003 | Kutsuna et al. | 428/413 |
| 2004/0181013 A1 | 9/2004 | Schenkel | |
| 2005/0022929 A1 | 2/2005 | Schoenfeld | |
| 2005/0070634 A1 | 3/2005 | Lutz | |
| 2005/0143513 A1* | 6/2005 | Kitamura | 524/492 |
| 2005/0159511 A1* | 7/2005 | Kramer | 523/427 |
| 2005/0209401 A1 | 9/2005 | Lutz | |
| 2005/0215730 A1 | 9/2005 | Schoenfeld | |
| 2006/0205897 A1 | 9/2006 | Frick | |
| 2006/2076601 | 12/2006 | Lutz | |
| 2007/0066721 A1 | 3/2007 | Kramer | |

FOREIGN PATENT DOCUMENTS

| | | |
|---|---|---|
| EP | 1632533 A | 3/2006 |
| WO | 2005-118734 A | 12/2005 |

* cited by examiner

*Primary Examiner* — Philip Tucker
*Assistant Examiner* — Michael Orlando

(57) ABSTRACT

Core-shell rubbers are incorporated into epoxy adhesives. The adhesives are structural type adhesives that contain an epoxy resin and a toughener, and may contain a liquid rubber in addition to the core-shell rubber. The adhesives have good modulus and tensile strength, which are obtained without loss of elongation and adhesive properties.

4 Claims, No Drawings

STRUCTURAL EPOXY RESINS CONTAINING CORE-SHELL RUBBERS

This application claims benefit of U.S. Provisional Patent Application No. 60/922,878, filed 11 Apr. 2007.

This invention relates to a rubber-modified epoxy resin based adhesive.

Epoxy resin based adhesives are used in many applications. In the automotive industry, epoxy resin adhesives are used in many bonding applications, including metal-metal bonding in frame and other structures in automobiles. Some of these adhesives must strongly resist failure during vehicle collision situations. Adhesives of this type are sometimes referred to as "crash durable adhesives", or "CDAs".

In order to obtain the good balance of properties that are needed to meet stringent automotive performance requirements, epoxy adhesives are often formulated with various rubbers and "tougheners". The rubber is typically a liquid polymer or copolymer of a diene monomer, such as a butadiene-acrylonitrile copolymer of the types described in U.S. Pat. No. 6,586,089 and U.S. Published Patent Application No. 2005/0070634. A commonly used toughener is a capped polyurethane and/or polyurea as described in U.S. Pat. No. 5,278,257. CDAs tend to have somewhat high rubber contents, typically in the range of from 4 to 20% by weight, especially from 5 to 15%, in order to provide the necessary balance of adhesion, impact resistance, and strength. More general purpose automotive adhesives tend to contain lower amounts of rubbers (such as up to about 4% by weight), as the demands on these adhesives is usually not as great.

There is a desire to further improve these adhesives, in particular by increasing mechanical properties such as tensile strength and modulus. These enhanced mechanical properties should be obtained with little or no loss of other needed properties such as adhesive strength, impact peel strength and elongation. In addition, the adhesive should retain useful properties over a temperature range that can be as wide as $-40°$ C. to $+80°$ C., and the adhesive preferably forms strong bonds to a variety of metal substrates, including cold rolled steel and galvanized metals. A particular problem in the industry is obtaining good adhesion to brittle metals such as galvaneal, which is a steel product having a zinc-iron surface coating that is high in iron content and therefore is somewhat brittle.

There is also a desire to improve the heat resistance of automotive adhesives. In the automotive assembly process, the frame is typically bonded and welded together, and then subjected to one or more coating steps. Automotive coatings are often baked in order to cure them to produce a hard finish. The baking temperatures can range from $140°$ C. to over $200°$ C. It has been found that exposure to these temperatures can cause a deterioration of impact properties and adhesion, particularly if the exposure time to these temperatures is long. This decline in properties tends to be more apparent at low temperatures.

This invention is a structural adhesive, comprising:
A) at least one particulate core-shell rubber;
B) a reactive toughener that has isocyanate groups that are blocked or capped with a phenolic compound, an aminophenolic compound, a primary or secondary aliphatic or cycloaliphatic amine, a benzyl alcohol, an aromatic amine, a benzyl amine or a thiol;
C) at least one non-rubber-modified epoxy resin; and
D) one or more epoxy curing agents,
wherein the structural adhesive is curable at a temperature of $80°$ C. or higher.

This structural adhesive is characterized in that it bonds well to various metal (and other) substrates and, when cured, exhibites good elongation and excellent mechanical properties such as tensile strength and modulus.

In certain preferred aspects, this invention is a structural adhesive, comprising:
A) at least 10 weight percent, based on the weight of the adhesive, of one or more liquid rubber-modified epoxy resins;
B) at least 2 weight percent, based on the weight of the adhesive, of particles of at least one core-shell rubber;
C) at least 8 weight percent, based on the weight of the adhesive, of a reactive toughener that has isocyanate groups that are blocked or capped with a phenolic compound, an aminophenolic compound, a primary or secondary aliphatic or cycloaliphatic amine, a benzyl alcohol, an aromatic amine, a benzyl amine or a thiol;
D) at least one non-rubber-modified epoxy resin; and
E) one or more epoxy curing agents,
wherein the structural adhesive has a total rubber content of from 8 to 30% by weight and is curable at a temperature of $80°$ C. or higher.

The preferred structural adhesive is particularly impact-resistant and so is useful in bonding automotive frame components to each other and to bond other components to an automotive frame. The preferred adhesive tends to be more thermally resistant than conventional epoxy adhesives, and often can withstand exposure to temperatures of from 140 to $200°$ C. with little or no loss of adhesive strength, especially little or no loss of adhesive strength at low temperatures such as $-40°$ C. It is especially preferred that at least a portion of the liquid rubber in component a) has a glass transition temperature of $-40°$ C. or below, as this promotes low temperature adhesion in the cured resin, particularly under shock stress.

The preferred structural adhesive has also been found to bond well to brittle metal surface such as a hot dip zinc coated steel or a zinc/iron coated-steel (galvaneal) surface, in particular when the core-shell rubber particles constitute at least 2.5 weight percent of the structural adhesive, the total rubber content is at least 10 weight % and the structural adhesive contains at least 10 weight % of the reactive toughener.

The structural adhesive of the invention contains at least one core-shell rubber. The core-shell rubber is a particulate material having a rubbery core. The rubbery core preferably has a $T_g$ of less than $-20°$ C., more preferably less than $-50°$ C. and even more preferably less than $-70°$ C. The $T_g$ of the rubbery core may be well below $-100°$ C. The core-shell rubber also has at least one shell portion that preferably has a $T_g$ of at least $50°$ C. By "core", it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material is preferably grafted onto the core or is crosslinked. The rubbery core may constitute from 50 to 95%, especially from 60 to 90%, of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethylhexylacrylate. The core polymer may in addition contain up to 20% by weight of other copolymerized monounsaturated monomers such as styrene, vinyl acetate, vinyl chloride, methyl methacrylate, and the like. The core polymer is optionally crosslinked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below −100° C. Core-shell rubbers having a silicone rubber core include those commercially available from Wacker Chemie, Munich, Germany, under the trade name Genioperl™.

The shell polymer, which is optionally chemically grafted or crosslinked to the rubber core, is preferably polymerized from at least one lower alkyl methacrylate such as methyl-, ethyl- or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer is generally between 20,000 and 500,000.

A preferred type of core-shell rubber has reactive groups in the shell polymer which can react with an epoxy resin or an epoxy resin hardener. Glycidyl groups such as are provided by monomers such as glycidyl methacrylate are suitable.

A particularly preferred type of core-shell rubber is of the type described in EP 1 632 533 A1. Core-shell rubber particles as described in EP 1 632 533 A1 include a crosslinked rubber core, in most cases being a crosslinked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in EP 1 632 533 A1.

Preferred core-shell rubbers include those sold by Kaneka Corporation under the designation Kaneka Kane Ace, including Kaneka Kane Ace MX 156 and Kaneka Kane Ace MX 120 core-shell rubber dispersions. The products contain the core-shell rubber particles pre-dispersed in an epoxy resin, at a concentration of approximately 25%. The epoxy resin contained in those products will form all or part of the non-rubber-modified epoxy resin component of the structural adhesive of the invention.

The core-shell rubber particles can constitute from 1 to 15 weight percent of the structural adhesive. When the adhesive is used as a CDA, the core-shell rubber particles preferably constitute at least 2 weight %, at least 2.5 weight % or at least 3 weight percent of the structural adhesive. The core-shell rubber particles preferably constitute no more than 12 weight percent, more preferably no more than 8 weight percent of the structural adhesive.

The structural adhesive also contains at least one reactive toughener. The reactive toughener is a liquid or low-melting elastomeric material having isocyanate groups that are capped or blocked with, for example, a phenolic compound, an aminophenolic compound, a primary or secondary aliphatic or cycloaliphatic amine, a benzyl alcohol, an aromatic amine, a benzyl amine or a thiol compound. The capping or blocking group may contain additional functional groups such as phenols or aromatic amino groups, but the capping or blocking group may instead be devoid of such groups. The reactive toughener should be soluble or dispersible in the remainder of the reactive components of the structural adhesive. Tougheners of these types and methods for preparing them are described, for example, in U.S. Pat. No. 5,202,390, U.S. Pat. No. 5,278,257, WO 2005/118734, U.S. Published Patent Application No. 2005/0070634, U.S. Published Patent Application No. 2005/0209401 and U.S. Published Patent Application 2006/0276601. The elastomeric portion of the reactive toughener advantageously includes a polyether, polybutadiene or polyester segment. The polyether, polybutadiene or polyester segment may form part of a polyurethane and/or polyurea backbone.

The reactive toughener preferably has a viscosity at 45° C. which is not greater than 1000 Pa·s and more preferably no more than about 800 Pa·s. Preferably, the weight average molecular weight of the toughener is about 8,000 or greater, and more preferably about 10,000 or greater. Preferably, the molecular weight of the toughener is about 70,000 or less, and more preferably about 40,000 or less. Molecular weights as used herein are determined according to GPC analysis.

The reactive toughener preferably contains an average of no more than 6 blocked or capped terminal groups per molecule. Preferably the average number of such groups is at least 1, more preferably at least 2, up to about 4 per molecule.

The reactive toughener is preferably non-crosslinked or lightly crosslinked, preferably having a crosslink density of about 2 or less and preferably about 1 or less. Crosslink density is the number of attachments between chains of polymers.

A preferred class of reactive tougheners includes those corresponding to Formula I:

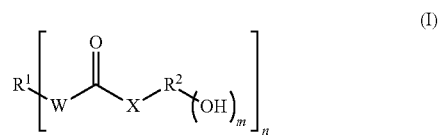

wherein m is 1 or 2, n is 2 to 6, $R^1$ is an n-valent radical of an elastomeric prepolymer after the removal of the terminal isocyanate, amino or hydroxyl group(s), the elastomeric prepolymer being soluble or dispersible in epoxy resin, W and X are independently —O— or —$NR^3$—, at least one of W and X being —$NR^3$—, $R^2$ is an m+1-valent radical of a polyphenol or aminophenol after the removal of a phenolic hydroxyl group when X is —O— and of the amino group when X is —$NR^3$—, and $R^3$ is hydrogen, a $C_1$ to $C_6$ alkyl or phenyl. Such tougheners are described in more detail in EP-A-0 308 664 (page 5, line 14, to page 13, line 24), and in U.S. Pat. No. 5,278,257 (at column 2, lines 14 to 33 and column 4, line 19 and column 16, line 18), the disclosures of which are incorporated herein by reference.

Other suitable reactive tougheners correspond to Formula II and/or Formula III:

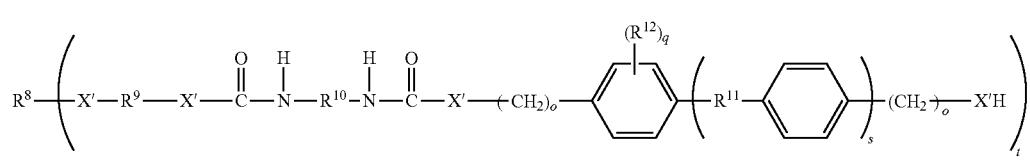

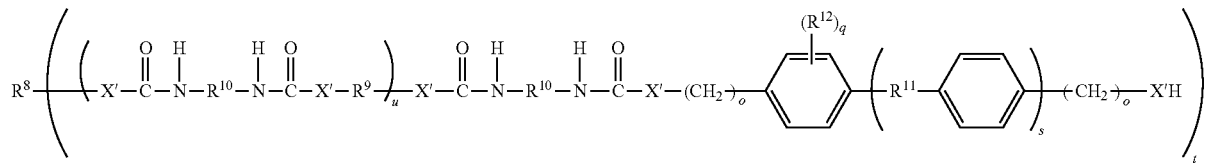

wherein $R^8$ is independently in each occurrence a $C_{2\text{-}20}$ m-valent alkyl moiety; $R^9$ is independently in each occurrence a polyether chain; $R^{10}$ is independently in each occurrence an alkylene, cycloalkylene or mixed alkylene and cycloalkylene moiety, optionally containing one or more oxygen or sulfur atoms; $R^{11}$ is a direct bond or an alkylene, carbonyl, oxygen, carboxyloxy, or amido moiety; $R^{12}$ is independently in each occurrence an alkyl, alkenyl, alkoxy, aryloxy or aryloxy moiety with the proviso that if s=1, then q=0; X' is O or —$NR^{13}$ with the proviso that X' is O where s is 1; and that where s is 0, X' is O in at least one occurrence; $R^{13}$ is independently in each occurrence hydrogen or alkyl; t is independently in each occurrence a number of about 1 to about 6; u is independently in each occurrence a number of 1 or greater; o is independently in each occurrence 0 or 1 if s is 0 and 0 if s is 1; s is independently in each occurrence 0, or 1; and q is independently in each occurrence a number of from 0 to 1.

Still another useful class of reactive tougheners corresponds to formula IV:

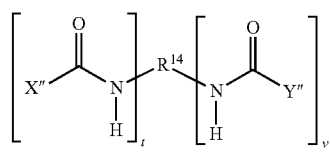

wherein $R^{14}$ is the elastomeric prepolymer residue after removal of isocyanate groups, said residue having a valence of t+v=2 to 6 with t=1 to 6 and v=0 to 5, X″ is the residue of the primary or secondary aliphatic, cycloaliphatic, heteroaromatic and/or aralphatic amine, a thiol and/or an alkyl amide after removal of an amine or thiol hydrogen and Y″ is the residue of the phenol and/or the polyphenol after removal of a phenolic hydrogen.

Preferred reactive tougheners are isocyanate-terminated prepolymers formed form a polyether polyol and an aliphatic polyisocyanate, in which the terminal isocyanate groups are blocked with a phenol, aminophenol, polyphenol or an allylphenol such as o,o-diallyl bisphenol A.

The reactive toughener is present in sufficient amount to improve the performance of adhesive compositions containing it under dynamic load. Preferably, the reactive toughener is present in an amount of about 5% by weight of the adhesive composition or greater, preferably at least about 8% by weight of the adhesive composition. For CDA applications, the reactive toughener more preferably constitutes at least about 12 weight percent of the adhesive composition. The reactive toughener may constitute up to 40% by weight of the adhesive composition, preferably up to about 30% by weight of the adhesive composition.

The structural adhesive contains at least one non-rubber-modified epoxy resin. As noted, the core-shell rubber product generally will be dispersed in some quantity of epoxy resin, and some amount of non-rubber-modified epoxy resin may be brought into the structural adhesive in that manner. A rubber-modified epoxy resin product used as a component of the structural adhesive may also contain a certain amount of epoxy resin which is not reacted with the rubber (and thus is not rubber-modified). Alternatively or in addition, the non-rubber-modified epoxy resin may be added to the structural adhesive as a separate component.

A wide range of epoxy resins can be used as the non-rubber-modified epoxy resin, including those described at column 2 line 66 to column 4 line 24 of U.S. Pat. No. 4,734,332, incorporated herein by reference.

Suitable epoxy resins include the diglycidyl ethers of polyhydric phenol compounds such as resorcinol, catechol, hydroquinone, bisphenol, bisphenol A, bisphenol AP (1,1-bis(4-hydroxylphenyl)-1-phenyl ethane), bisphenol F, bisphenol K, tetramethylbiphenol, diglycidyl ethers of aliphatic glycols and polyether glycols such as the diglycidyl ethers of $C_{2\text{-}24}$ alkylene glycols and poly(ethylene oxide) or poly(propylene oxide) glycols; polyglycidyl ethers of phenol-formaldehyde novolac resins, alkyl substituted phenol-formaldehyde resins (epoxy novalac resins), phenol-hydroxybenzaldehyde resins, cresol-hydroxybenzaldehyde resins, dicyclopentadiene-phenol resins and dicyclopentadiene-substituted phenol resins, and any combination thereof.

Suitable diglycidyl ethers include diglycidyl ethers of bisphenol A resins such as are sold by Dow Chemical under the designations D.E.R.® 330, D.E.R.® 331, D.E.R.® 332, D.E.R.® 383, D.E.R.® 661 and D.E.R.® 662 resins.

Commercially available diglycidyl ethers of polyglycols that are useful include those sold as D.E.R.® 732 and D.E.R.® 736 by Dow Chemical.

Epoxy novolac resins can be used. Such resins are available commercially as D.E.N.® 354, D.E.N.® 431, D.E.N.® 438 and D.E.N.® 439 from Dow Chemical.

Other suitable additional epoxy resins are cycloaliphatic epoxides. A cycloaliphatic epoxide includes a saturated carbon ring having an epoxy oxygen bonded to two vicinal atoms in the carbon ring, as illustrated by the following structure V:

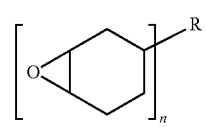

wherein R is an aliphatic, cycloaliphatic and/or aromatic group and n is a number from 1 to 10, preferably from 2 to 4. When n is 1, the cycloaliphatic epoxide is a monoepoxide. Di- or polyepoxides are formed when n is 2 or more. Mixtures of mono-, di- and/or polyepoxides can be used. Cycloaliphatic epoxy resins as described in U.S. Pat. No. 3,686,359, incorporated herein by reference, may be used in the present invention. Cycloaliphatic epoxy resins of particular interest are (3,4-epoxycyclohexyl-methyl)-3,4-epoxy-cyclohexane carboxylate, bis-(3,4-epoxycyclohexyl)adipate, vinylcyclohexene monoxide and mixtures thereof.

Other suitable epoxy resins include oxazolidone-containing compounds as described in U.S. Pat. No. 5,112,932. In addition, an advanced epoxy-isocyanate copolymer such as those sold commercially as D.E.R. 592 and D.E.R. 6508 (Dow Chemical) can be used.

The non-rubber-modified epoxy resin preferably is a bisphenol-type epoxy resin or mixture thereof with up to 10 percent by weight of another type of epoxy resin. The most preferred epoxy resins are bisphenol-A based epoxy resins and bisphenol-F based epoxy resins.

The non-rubber-modified epoxy resin is used in sufficient amount to impart desirable adhesive and strength properties. Preferably, the non-rubber-modified epoxy resin will constitute at least about 10 weight percent of the structural adhesive, more preferably about 15 weight percent, and most preferably about 20 part weight percent. The non-rubber-modified epoxy resin preferably constitutes up to about 60 weight percent of the structural adhesive, more preferably up to about 50 weight percent, and most preferably about 40 weight percent. These amounts include amounts of non-rubber-modified epoxy resin (if any) that are brought into the composition with the core-shell rubber and any liquid rubber-modified epoxy resin(s) as may be used.

The structural adhesive further contains a curing agent. The curing agent is selected together with any catalysts such that the adhesive cures when heated to a temperature of 80° C. or greater, preferably 100° C. or greater, but cures very slowly if at all at room temperature (~22° C.) and temperatures up to at least 50° C. Suitable such curing agents include materials such as boron trichloride/amine and boron trifluoride/amine complexes, dicyandiamide, melamine, diallylmelamine, guanamines such as acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. The use of dicyandiamide, isophthalic acid dihydrazide, adipic acid dihydrazide and 4,4'-diaminodiphenylsulphone is particularly preferred.

The curing agent is used in sufficient amount to cure the composition. Preferably, the curing agent constitutes at least about 1.5 weight percent of the structural adhesive, more preferably at least about 2.5 weight percent and even more preferably at least about 3.0 weight percent. The curing agent preferably constitutes up to about 15 weight percent of the structural adhesive composition, more preferably up to about 10 weight percent, and most preferably up to about 8 weight percent.

The structural adhesive will in most cases contain a catalyst to promote the cure of the adhesive. Among preferred epoxy catalysts are ureas such as p-chlorophenyl-N,N-dimethylurea (Monuron), 3-phenyl-1,1-dimethylurea(Phenuron), 3,4-dichlorophenyl-N,N-dimethylurea(Diuron), N-(3-chloro-4-methylphenyl)-N',N'-dimethylurea(Chlortoluron), tert-acryl- or alkylene amines like benzyldimethylamine, 2,4,6-tris(dimethylaminomethyl)phenol, piperidine or derivates thereof, imidazole derivates, in general $C_1$-$C_{12}$ alkylene imidazole or N-arylimidazols, such as 2-ethyl-2-methylimidazol, or N-butylimidazol, 6-caprolactam, a preferred catalyst is 2,4,6-tris(dimethylaminomethyl)phenol integrated into a poly(p-vinylphenol) matrix (as described in European patent EP 0 197 892). The catalyst may be encapsulated or otherwise be a latent type which becomes active only upon exposure to elevated temperatures. Preferably, the catalyst is present in an amount of at least about 0.1 weight percent of the structural adhesive, and more preferably at least about 0.5 weight percent. Preferably, the epoxy curing catalyst constitutes up to about 2 weight percent of the structural adhesive, more preferably up to about 1.0 weight percent, and most preferably up to about 0.7 weight percent.

In some embodiments, the structural adhesive of the invention also includes at least one liquid rubber-modified epoxy resin. The rubber-modified epoxy resin is a reaction product of an epoxy resin and at least one liquid rubber that has epoxide-reactive groups, such as amino or preferably carboxyl groups. The resulting adduct has reactive epoxide groups which can be cured further when the structural adhesive is cured. It is preferred that at least a portion of the liquid rubber has a glass transition temperature ($T_g$) of −40° C. or lower, especially −50° C. or lower. Preferably, each of the rubbers (when more than one is used) has a glass transition temperature of −25° C. or lower. The rubber $T_g$ may be as low as −100° C. or even lower.

The liquid rubber is preferably a homopolymer of a conjugated diene or copolymer of a conjugated diene, especially a diene/nitrile copolymer. The conjugated diene rubber is preferably butadiene or isoprene, with butadiene being especially preferred. The preferred nitrile monomer is acrylonitrile. Preferred copolymers are butadiene-acrylonitrile copolymers. The rubbers preferably contain, in the aggregate, no more than 30 weight percent polymerized unsaturated nitrile monomer, and preferably no more than about 26 weight percent polymerized nitrile monomer.

The rubber preferably contains from about 1.5, more preferably from about 1.8, to about 2.5, more preferably to about 2.2, of epoxide-reactive terminal groups per molecule, on average. Carboxyl-terminated rubbers are preferred. The molecular weight ($M_n$) of the rubber is suitably from about 2000 to about 6000, more preferably from about 3000 to about 5000.

Suitable carboxyl-functional butadiene and butadiene/acrylonitrile rubbers are commercially available from Noveon under the tradenames Hycar® 2000X162 carboxyl-terminated butadiene homopolymer, Hycar® 1300X31, Hycar® 1300X8, Hycar® 1300X13, Hycar® 1300X9 and Hycar® 1300X18 carboxyl-terminated butadiene/acrylonitrile copolymers. A suitable amine-terminated butadiene/acrylonitrile copolymer is sold under the tradename Hycar® 1300X21.

The rubber is formed into an epoxy-terminated adduct by reaction with an excess of an epoxy resin. Enough of the epoxy resin is provided to react with substantially all of the epoxide-reactive groups on the rubber and to provide free epoxide groups on the resulting adduct without significantly advancing the adduct to form high molecular weight species. A ratio of at least two equivalents of epoxy resin per equivalent of epoxy-reactive groups on the rubber is preferred. More preferably, enough of the epoxy resin is used that the resulting product is a mixture of the adduct and some free epoxy resin. Typically, the rubber and an excess of the polyepoxide are mixed together with a polymerization catalyst and heated to a temperature of about 100 to about 250° C. in order to form the adduct. Suitable catalysts include those described before. Preferred catalysts for forming the rubber-modified epoxy resin include phenyl dimethyl urea and triphenyl phosphine.

A wide variety of epoxy resins can be used to make the rubber-modified epoxy resin, including any of those described above. The epoxy resin may be the same or different from that used to prepare the rubber-modified epoxy resin. Preferred polyepoxides are liquid or solid glycidyl ethers of a bisphenol such as bisphenol A or bisphenol F. Halogenated, particularly brominated, resins can be used to impart flame retardant properties if desired. Liquid epoxy resins (such as DER™ 330 and DER™ 331 resins, which are diglycidyl ethers of bisphenol A available from The Dow Chemical Company) are especially preferred for ease of handling.

The rubber-modified epoxy resin(s) preferably constitute at least about 4 weight percent of the structural adhesiver, more preferably at least about 5 weight percent. The rubber-modified epoxy resin may constitute up to about 30 weight percent of the structural adhesive, more preferably up to about 20 weight percent, and even more preferably up to about 15 weight percent.

The total rubber content of the structural adhesive of the invention can range from as little as 1 weight percent, preferably 2.5 weight percent, to as high as 30 weight percent. General-purpose structural adhesives may have a total rubber content of from 2.5 to 4 weight percent. CDAs often have a higher total rubber content, such as from 4 weight percent, preferably from 5 weight percent, more preferably from 7 weight percent, still more preferably from 8 weight percent and even more preferably from 10 weight percent, to as much as 30 weight percent, preferably to 20 weight percent and more preferably 15 weight percent. It has been found that especially good adhesion to brittle metals such as hot dip zinc coated steel or zinc/iron (galvaneal)-coated steel is achieved if the total rubber content is at least 10%.

Total rubber content is calculated for purposes of this invention by determining the weight of core-shell rubber, plus the weight contributed by the liquid rubber portion of any rubber-modified epoxy resin as may be used. In each case, the weight of unreacted (non-rubber-modified) epoxy resins and/or other carriers, diluents, dispersants or other ingredients that may be contained in the core-shell rubber product or rubber-modified epoxy resin is not included. The weight of the shell portion of the core-shell rubber is counted as part of the total rubber content for purposes of this invention.

The structural adhesive of the invention may contain various optional components. Among these, fillers and one or more additional epoxy resins are particularly preferred.

A filler, rheology modifier and/or pigment is preferably present in the structural adhesive. These can perform several functions, such as (1) modifying the rheology of the adhesive in a desirable way, (2) reducing overall cost per unit weight, (3) absorbing moisture or oils from the adhesive or from a substrate to which it is applied, and/or (4) promoting cohesive, rather than adhesive, failure. Examples of these materials include calcium carbonate, calcium oxide, talc, coal tar, carbon black, textile fibers, glass particles or fibers, aramid pulp, boron fibers, carbon fibers, mineral silicates, mica, powdered quartz, hydrated aluminum oxide, bentonite, wollastonite, kaolin, fumed silica, silica aerogel or metal powders such as aluminum powder or iron powder. Among these, calcium carbonate, talc, calcium oxide, fumed silica and wollastonite are preferred, either singly or in some combination, as these often promote the desired cohesive failure mode.

A filler of particular interest is a microballon having an average particle size of up to 200 microns and density of up to 0.2 g/cc. The particle size is preferably about 25 to 150 microns and the density is preferably from about 0.05 to about 0.15 g/cc. Expanded microballoons which are suitable include those commercially available from Dualite Corporation under the trade designation Dualite™, and also from Lehmann & Voss, Hamburg, Germany. Specific examples of suitable polymeric microballons include Dualite™ E065-135 and Dualite E130-40D microballons. Microballons of the type have been found to strongly promote the desired cohesive failure when used at a level of from about 1 to about 5 weight percent, preferably 1.5 to 3 weight percent, of the structural adhesive. Microballons are preferably used in conjunction with one or more additional fillers, such as talc, calcium oxide, wollastonite, fumed silica, calcium carbonate or mixtures thereof.

Fillers, pigments and rheology modifiers preferably are used in an aggregate amount of about 5 parts per hundred parts of adhesive composition or greater, more preferably about 10 parts per hundred parts of adhesive composition or greater. They preferably are present in an amount of up to about 25 weight percent of the structural adhesive, more preferably up to about 20 weight percent, and most preferably up to about 15 weight percent.

If desired, a structural adhesive of the invention may also contain a bisphenol component. This is especially desirable in cases in which the structural adhesive contains a liquid rubber-modified epoxy resin. The bisphenol component is any compound having two or more, preferably two, phenolic hydroxyl groups per molecule. Examples of suitable bisphenol compounds include, for example, resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol and the like. The bisphenol component can be dissolved into the structural adhesive composition or present in the form of finely divided particles. Alternatively and preferably, the bisphenol component is pre-reacted with one or more of the rubber-modified epoxy resins to advance the resin somewhat. If used, the bisphenol component is preferably used in an amount from about 3 to about 35 parts by weight per 100 parts by weight of the rubber component in the rubber-modified epoxy resin. A preferred amount is from about 5 to about 25 parts by weight per 100 parts by weight of the rubber component of the rubber-modified epoxy resin. When the bisphenol component is added directly into the structural adhesive, it usually constitutes from 0.2 to 2 weight percent, especially from 0.4 to 1.5 weight percent, of the structural adhesive.

The structural adhesive can further contain other additives such as diluents, plasticizers, extenders, pigments and dyes, fire-retarding agents, thixotropic agents, flow control agents, adhesion promoters and antioxidants. The adhesive may also contain a thermoplastic powder such as polyvinyl butyral or a polyester polyol, as described in WO 2005/118734.

The adhesive composition can be applied by any convenient technique. It can be applied cold or be applied warm if desired. It can be applied by extruding it from a robot into bead form on the substrate, it can be applied using mechanical application methods such as a caulking gun, or any other manual application means, it can also be applied using a swirl technique. The swirl technique is applied using an apparatus well known to one skilled in the art such as pumps, control systems, dosing gun assemblies, remote dosing devices and application guns. Preferably, the adhesive is applied to the substrate using a streaming process. Generally, the adhesive is applied to one or both substrates. The substrates are contacted such that the adhesive is located between the substrates to be bonded together.

After application, the structural adhesive is cured by heating to a temperature at which the curing agent initiates cure of the epoxy resin composition. Generally, this temperature is about 80° C. or above, preferably about 100° C. or above. Preferably, the temperature is about 220° C. or less, and more preferably about 180° C. or less.

The adhesive of the invention can be used to bond a variety of substrates together including wood, metal, coated metal, aluminum, a variety of plastic and filled plastic substrates, fiberglass and the like. In one preferred embodiment, the adhesive is used to bond parts of automobiles together or parts to automobiles. Such parts can be steel, coated steel, galvanized steel (such as electrogalvanized, hot-dip zinc coated steel or zinc/iron (galvaneal)-coated steel), aluminum, coated aluminum, plastic and filled plastic substrates.

An application of particular interest is bonding of automotive frame components to each other or to other components. The frame components are often metals such as cold rolled steel, galvanized metals such as electrogalvanized steel, hot-dip zinc coated steel or zinc/iron coated steel (galvaneal), or aluminum. The components that are to be bonded to the frame components can also be metals as just described, or can be other metals, plastics, composite materials, and the like.

Adhesion to metals that have a brittle surface, such as hot dip zinc coated steel and zinc/iron-coated steel (galvaneal), is of particular interest in the automotive industry. Galvaneal has a zinc-iron surface that is somewhat rich in iron content and is brittle for that reason. A particular advantage of this invention is that the cured adhesive bonds well to metals that have a brittle surface, such as hot dip zinc-coated galvaneal and other galvanized steels. This is particularly the case when the core-shell rubber particles constitute at least 2.5 weight percent of the structural adhesive, the total rubber content of the structural adhesive is at least 10 weight % and the structural adhesive contains at least 10 weight % of the reactive toughener.

Assembled automotive frame members are usually coated with a coating material that requires a bake cure. The coating is typically baked at temperatures that may range from 140° C. to over 200° C. In such cases, it is often convenient to apply the structural adhesive to the frame components, then apply the coating, and cure the adhesive at the same time the coating is baked and cured.

The presence of the core-shell rubber has been found to contribute to various desirable attributes in the cured structural adhesive. A significant advantage is that tensile strength and modulus of the cured adhesive are often increased, with little or no loss of elongation and impact strength. This advantage is often seen in both general purpose structural adhesives that contain from 2.5 to 4 weight % total rubber as well as CDAs that contain from 4 to 20 weight % total rubber or more. In CDA products containing 4%, preferably 7%, especially 8%, or more total rubber and 8%, especially 12 weight % or more of the reactive toughener, the core-shell rubber is believed to contribute to increases in impact peel strength.

Structural adhesives of the invention that contain both core-shell rubbers and liquid rubber-modified epoxy resins are believed in some instances to better resist thermal degradation of their adhesive properties. In automotive applications, thermal degradation of the structural adhesive is believed to occur due to singular or repeated exposure to elevated temperatures as various coatings are baked and cured during the process of assembling a vehicle. This is believed to cause a certain degradation of the adhesive properties, especially at cold temperatures (such as −30° C. or −40° C.). The better resistance to thermal degradation is most evident in structural adhesives that contain at least 8% total rubber and especially those which also contain 12% or more of the reactive toughener.

The cured adhesive composition preferably exhibits an elongation (measured according to DIN EN ISO 527-1) to break of at least 4% for a low total rubber (not more than 4 weight percent rubber) structural and of at least 9% for a high rubber (4% or greater rubber) structural adhesive.

The adhesive composition once cured preferably has a Young's modulus of about 1200 MPa as measured according to DIN EN ISO 527-1. Preferably the Young's modulus is about 1500 MPa or greater, more preferably at least 1800 MPa and even more preferably at least 2200 MPa. Preferably, the cured adhesive demonstrates a tensile strength of about 30 MPa or greater, more preferably about 38 MPa or greater, and most preferably about 45 MPa or greater. Preferably, the lap shear strength of a 1.5 mm thick cured adhesive layer on cold rolled steel (CRS) and galvaneal is about 15 MPa or greater, more preferably about 20 MPa or greater, and most preferably about 25 MPa or greater measured according to DIN EN 1465.

An especially preferred structural adhesive of the invention also exhibits (when cured) mainly cohesive failure when evaluated in an impact peel testing method as described below in the Examples. Balancing cohesive failure with high impact peel strengths is usually difficult, as formulation changes that favor cohesive failure, such as the inclusion of higher levels of fillers, often tend to reduce impact peel.

The following examples are provided to illustrate the invention but are not intended to limit the scope thereof. All parts and percentages are by weight unless otherwise indicated.

Products used in the following examples are identified as follows:

DER™ 330 is a liquid diglycidyl ether of bisphenol A, available from The Dow Chemical Company. It has an epoxy equivalent weight of approximately 180.

DER™ 331 is a liquid diglycidyl ether of bisphenol A, available from The Dow Chemical Company. It has an epoxy equivalent weight of approximately 187.

XZ 92579 is an experimental blend of solid and liquid diglycidyl ethers of bisphenol A.

Struktol™ 3614 is a reaction product of approximately 60% of a liquid diglycidyl ether of bisphenol F, and 40% of Hycar 1300X13 rubber (a carboxy-terminated butadiene-acrylonitrile copolymer having a $T_g$ greater than −40° C., available from Noveon). It is commercially available from Schill & Seilacher.

Struktol 3611 is a reaction product of approximately 50% of a liquid diglycidyl ether of bisphenol F, 40% of Hycar 1300X13 rubber (a carboxy-terminated butadiene-acrylonitrile copolymer having a $T_g$ greater than −40° C., available from Noveon) and from 2 to 5% of bisphenol A. It is commercially available from Schill & Seilacher.

Toughener 3911 is a blend of 1 part of Strucktol 3611 and 2 parts of DER™ 330 epoxy resin.

Struktol™ 3604 is a reaction product of approximately 60% a liquid diglycidyl ether of bisphenol A and 40% of Hycar 1300X8 rubber (a carboxy-terminated butadiene-acrylonitrile copolymer having a $T_g$ of about −52° C., available from Noveon). It is commercially available from Schill & Seilacher.

RAM 965 reactive toughener is an isocyanate-terminated polyurethane prepolymer prepared from a polyether polyol and an aliphatic diisocyanate, in which the isocyanate groups are capped with o,o-diallyl bisphenol A, and is made as described in Example 13 of EP 308 664.

RAM B reactive toughener is an isocyanate-terminated polyurethane prepolymer prepared from a polyether polyol and an aliphatic diisocyanate, in which the isocyanate groups are capped with bisphenol A. It is described as Toughener B in U.S. Published Patent Application No. 2005/0070634.

Cardura™ E10 is versatic acid monoepoxy ester, available from Shell Chemicals.

Sylquest Silane A187 is an epoxy silane available from GE Silicones.

Amicure™ CG-1200 is a cyanoguanidine epoxy hardener available from Air Products and Chemicals.

EP796 is tris (2,4,6-dimethylaminomethyl)phenol in a poly(vinylphenol) matrix.

Nyad™ M400 is a particulate wollastonite from Nyco.

Microthene™ FE53200 is a 20 micron, 8 melt index, 0.926 density powered ethylene vinylacetate polymer from Equistar Chemicals.

Kaneka Kane Ace MX 120 is a dispersion of about 25% of a core-shell rubber in an epoxy resin. The core-shell rubber has a crosslinked polybutadiene core. It is available commercially from Kaneka Corporation.

Kaneka Kane Ace MX 156 is a dispersion of about 25% of a core-shell rubber in an epoxy resin. The core-shell rubber has a crosslinked polybutadiene core. It is available commercially from Kaneka Corporation.

EXAMPLES 1 AND 2 AND COMPARATIVE EXAMPLE C-1

Structural adhesive Examples 1 and 2 and Comparative Sample C-1 are prepared from the components set forth in Table 1.

TABLE 1

| Components | Parts By Weight Example or Comparative Sample No. | | |
|---|---|---|---|
| | 1 | 2 | C-1* |
| MX120 Core-Shell Rubber Dispersion | 24.0 | 0 | 0 |
| MX156 Core-Shell Rubber Dispersion | 0 | 24.0 | 0 |
| DER 330 Epoxy Resin | 39.6 | 39.6 | 48.6 |
| RAM B | 9.7 | 9.7 | 9.7 |
| Strucktol 3604 | 0 | 0 | 15.0 |
| Cardura E10 | 1.1 | 1.1 | 1.1 |
| Colorants | 0.4 | 0.4 | 0.4 |
| Sylquest Silane A187 | 0.7 | 0.7 | 0.7 |
| Amicure CG-1200 | 5.6 | 5.6 | 5.6 |
| EP796 | 0.8 | 0.8 | 0.8 |
| Talc | 2.2 | 2.2 | 2.2 |
| Calcium Oxide | 3.7 | 3.7 | 3.7 |
| Calcium Carbonate | 3.7 | 3.7 | 3.7 |
| Polybutyral resin | 1.0 | 1.0 | 1.0 |
| Fumed Silica | 7.5 | 7.5 | 7.5 |
| % Total Rubber | 6.0 | 6.0 | 6.0 |

*Not an example of the invention.

The epoxy resin, core-shell rubber or rubber-modified epoxy resins, toughener and colorants, silane, Amicure CG-1200 and EP 796 are mixed on a planetary mixer for about 5 minutes. Waste heat raises the temperature of the mixture to about 50° C. One-half of each of the remaining ingredients is then added and the mixture stirred at about 50° C. for about 10 minutes. The remainder of the components are then added and the resulting mixture is stirred for another 10 minutes at about 50° C. A scrape-down is performed, and the components are mixed further for 30 minutes under vacuum.

Portions of each structural adhesive are cured at 180° C. for 30 minutes for bulk property testing.

Young's modulus, tensile strength and elongation are measured for each of the cured samples, according to DIN EN ISO 527-1.

Test specimens for testing lap shear strength, 23° C. impact peel strength and −40° impact peel strength are prepared. For lap shear strength testing, test specimens are prepared and tested in accordance with DIN EN 1465, using a bonding area of 25×10 mm, an adhesive layer thickness of 0.2 mm and a test speed of 10 mm/min. Substrates are cold rolled steel, hot dipped galvanized steel, electrogalvanised steel and with an aluminum alloy (AA 6016) as identified in the table below. For impact peel strength testing, specimens are prepared and tested in accordance with ISO 11343, using a bonding area of 30×20 mm, an adhesive layer thickness of 0.2 mm and a test speed of 2 m/s. Substrates for impact peel strength testing are cold rolled steel. Curing in all cases is for 30 minutes at 180° C., and the samples are brought back to about 23° C. for testing unless otherwise indicated.

Results from the foregoing testing are as follows:

| | Example or Comparative Sample No. | | |
|---|---|---|---|
| | 1 | 2 | C-1* |
| Young's modulus (MPa) | 2500 | 2400 | 2200 |
| Tensile Strength (MPa) | 54 | 51 | 40 |
| Elongation (%) | 5 | 5 | 5 |
| Lap Shear Strength, 1.5 mm CRS[1] (MPa) | 28.8 | 29.9 | 27.7 |
| Impact peel strength, 23° C., 1.0 mm CRS (N/mm) | 21 | 23 | 22 |
| Impact peel strength, −40° C., 1.0 mm CRS (N/mm) | 7 | 10 | 10 |
| Lap Shear Strength (MPa), GI[1] | 30.0 | 31.2 | 27.0 |
| Lap Shear Strength (MPa), EGI[1] | 21.6 | 22.1 | 20.7 |
| Lap Shear Strength (MPa), AA6016[1] | 18.9 | 19.4 | 18.5 |

*Not an example of the invention.
[1]CRS is cold rolled steel. GI is 0.8 mm DX-56-DZ-140MB hot dipped galvanized steel. EGI is 0.8 mm JAC 270 galvaneal from Honda Corporation. AA6016 is 1.3 mm aluminum alloy surface treated with titanium and zirconium.

As can be seen from the foregoing data, replacement of the liquid rubber with a core-shell rubber leads to a significant improvement in modulus and tensile strength with no loss in elongation and little effect on adhesive properties, at equivalent total rubber contents.

EXAMPLES 3 AND 4 AND COMPARATIVE EXAMPLE C-2

Structural adhesive Examples 3 and 4 and Comparative Sample C-2 are prepared and tested in the same manner as described for Examples 1 and 2. The components used to make these adhesives are forth in Table 2.

TABLE 2

| Components | Parts By Weight Example or Comparative Sample No. | | |
|---|---|---|---|
| | 3 | 4 | C-2* |
| MX120 Core-Shell Rubber Dispersion | 20.4 | 0 | 0 |
| MX156 Core-Shell Rubber Dispersion | 0 | 20.4 | 0 |
| XZ 92579 Epoxy Resin | 42.5 | 42.5 | 50.2 |
| Strucktol 3604 | 0 | 0 | 12.8 |
| RAM B | 12.8 | 12.8 | 12.8 |
| Cardura E10 | 1.2 | 1.2 | 1.2 |
| Colorants | 0.4 | 0.4 | 0.4 |
| Sylquest Silane A187 | 0.7 | 0.7 | 0.7 |
| Amicure CG-1200 | 4.3 | 4.3 | 4.3 |
| EP796 | 0.9 | 0.9 | 0.9 |
| Talc | 2.3 | 2.3 | 2.3 |
| Calcium Oxide | 3.4 | 3.4 | 3.4 |
| Calcium Carbonate | 3.4 | 3.4 | 3.4 |

TABLE 2-continued

| Components | Parts By Weight Example or Comparative Sample No. | | |
|---|---|---|---|
| | 3 | 4 | C-2* |
| Fumed Silica | 7.8 | 7.8 | 7.8 |
| % Total Rubber | 5.1 | 5.1 | 5.1 |

Results from the foregoing testing are as follows:

| | Example or Comparative Sample No. | | |
|---|---|---|---|
| | 3 | 4 | C-2* |
| Young's modulus (MPa) | 2400 | 2300 | 2200 |
| Tensile Strength (MPa) | 54 | 51 | 42 |
| Elongation (%) | 5 | 4 | 6 |
| Lap Shear Strength (MPa), 1.5 mm CRS | 30.1 | 29.4 | 29.9 |
| Impact peel strength, 23° C. (N/mm), 1.0 mm CRS[1] | 22 | 24 | 24 |
| Impact peel strength, −40° C. (N/mm), 1.0 mm CRS | 4 | 8 | 10 |
| Lap Shear Strength (MPa), GI[1] | 31.2 | 31.2 | 30.3 |
| Lap Shear Strength (MPa), EGI[1] | 22.3 | 22.4 | 22.0 |
| Lap Shear Strength (MPa), AA6016[1] | 19.5 | 19.8 | 22.3 |

*Not an example of the invention.
[1]CRS is cold rolled steel. GI is 0.8 mm DX-56-DZ-140MB hot dipped galvanized steel. EGI is 0.8 mm JAC 270 galvaneal from Honda Corporation. AA6016 is 1.3 mm aluminum alloy surface treated with titanium and zirconium.

This data shows similar results as before. Replacement of the liquid rubber with a core-shell rubber leads to a significant improvement in modulus and tensile strength with no loss in elongation. Adhesive properties are not changed significantly, although some loss of impact peel strength at −40 C is seen on cold rolled steel.

EXAMPLES 5 AND 6 AND COMPARATIVE EXAMPLE C-3

Structural adhesive Examples 5 and 6 and Comparative Sample C-3 are prepared and tested for Young's modulus, tensile strength and elongation in the same manner as described for Examples 1 and 2. Example 6 is also tested for lap shear strength as described in Examples 1 and 2. These adhesives are higher rubber content compositions that are useful in CDA applications. The components used to make these adhesives are forth in Table 3.

TABLE 3

| Components | Parts By Weight Example or Comparative Sample No. | | |
|---|---|---|---|
| | 5 | 6 | C-3* |
| MX156 Core-Shell Rubber Dispersion | 42.5 | 14.0 | |
| DER 330 Epoxy Resin | 19.7 | 31.1 | 31.9 |
| RAM 965 | 18.5 | 18.2 | 18.2 |
| Strutkol 3614 | 0 | 17.1 | 30.0 |
| Cardura E10 | 1.2 | 1.2 | 1.1 |
| Colorants | 0.3 | 0.3 | 0.3 |
| Sylquest Silane A187 | 0.7 | 0.7 | 0.7 |
| Amicure CG-1200 | 4.4 | 4.8 | 4.8 |
| EP796 | 0.8 | 0.9 | 0.8 |
| Wetting Agent | 0 | 0.3 | 0.3 |
| Calcium Oxide | 3.9 | 3.8 | 3.6 |
| Calcium Carbonate | 3.9 | 3.8 | 3.6 |
| Fumed Silica | 4.0 | 3.9 | 4.7 |
| % Rubber | 11 | 10 | 12 |

Results from the foregoing testing are as follows:

| | Example or Comparative Sample No. | | |
|---|---|---|---|
| | 5 | 6 | C-3* |
| Young's modulus (MPa) | 1500 | 1600 | 1200 |
| Tensile Strength (MPa) | 40 | 36 | 30 |
| Elongation (%) | 10 | 15 | 16 |
| Lap Shear Strength (MPa), RT | ND | 30.3[1] | ND |
| Impact Peel Strength (N/mm), 23° C. | ND | 46[2] | ND |

*Not an example of the invention.
ND is not determined.
[1]Substrate is 1.6 mm metal JSC270 from Honda Corporation.
Substrate is 2.8 mm metal JSC270 from Honda Corporation.

Lap shear testing and 23° C. impact peel strength are performed in the manner described in Examples 1 and 2, using a good surface quality galvaneal (JAC 270 from Honda Corporation) as the substrate. Results are as follow:

| | Example or Comparative Sample No. | | |
|---|---|---|---|
| | 5 | 6 | C-3* |
| Lap Shear Strength (MPa), 1.6 mm JAC 270 galvaneal | 16.2 | 19.7 | 20.7 |
| Impact Peel Strength (N/mm), 0.8 mm JAC 270 galvaneal | 15 | 29 | 25 |

*Not an example of the invention.

Structural adhesive Example 6 is selected for further testing. Multiple bulk specimens are prepared for Young's modulus, tensile strength and elongation testing in the manner described in Example 1. Multiple lap shear specimens are prepared as described in Example 1. In the standard cure, all specimens are cured at 170° C. for 30 minutes, except for the overbake 1 and overbake 2, which are cured as described below. The cured bulk specimens and lap shear specimens are thereafter exposed to various aging regimens before testing, as follows. Testing is done at ~23° C. except as noted. Substrates are 1.6 mm Honda JSC270 metal. The conditioning regimens are:

Initial: no further conditioning. Lap shear testing is performed at −40° C., +80° C. and 23° C.

Overbake 1: Instead of the standard cure, the specimens are subjected to three cycles of heating to 170° C. for one hour followed by cooling to 23° C. for one hour.

Overbake 2: Instead of the standard cure, the specimens are subjected to three cycles of heating to 230° C. for 30 minutes followed by cooling to 23° C. for one hour.

Heat resistance: Cured specimens are heated to 100° C. for 10 days.

Humidity resistance: Cured specimens are exposed to 50° C. and 95% relative humidity for 10 days.

Hot water resistance: Cured specimens are dipped into 50° C. water for 10 days.

Thermal cycle: Cured specimens are exposed to five cycles as follows: 80° C. for 4 hours, 23° C. for 30 minutes, −40° C. for 4 hours, 23° C. for 30 minutes and 50° C., 95% relative humidity for 4 hours.

Results of this testing are as follows:

| Conditioning Regimen | Youngs Modulus, MPa | Tensile Strength, MPa | Elongation, % | Lap Shear Strength, MPa |
|---|---|---|---|---|
| Initial, 23° C. testing | 1565 | 35 | 14 | 30.3 |
| Initial, +80° C. testing | ND | ND | ND | 24.6 |
| Initial, −40° C. testing | ND | ND | ND | 39.0 |
| Overbake 1 | ND | ND | ND | 32.7 |
| Overbake 2 | ND | ND | ND | 33.4 |
| Heat Resistance | 1638 | 38 | 11 | 28.0 |
| Humidity Resistance | 1546 | 30 | 11 | 28.3 |
| Hot water resistance | 1580 | 31 | 13 | 24.7 |
| Thermal Cycle | ND | ND | ND | 31.1 |

EXAMPLES 7 AND 8 AND COMPARATIVE EXAMPLE C-4

Structural adhesive Examples 7 and 8 and Comparative Sample C-4 are prepared in the same manner as described for Examples 1 and 2, using components as described in Table 4. Lap shear testing and impact peel strength are performed in the manner described in Examples 1 and 2, using the JAC 270 galvaneal from Honda Corporation as the substrate.

TABLE 4

| Components | Parts By Weight Example or Comparative Sample No. | | |
|---|---|---|---|
|  | 7 | 8 | C-4* |
| MX156 Core-Shell Rubber Dispersion | 15.0 | 15.0 | 0 |
| DER 330 Epoxy Resin | 19.7 | 21.0 | 0 |
| RAM 965 | 18.5 | 16.5 | 17.2 |
| Toughener 3911 | 0 | 0 | 44.0 |
| Struktol 3614 | 15.7 | 0 | 0 |
| Strutkol 3611 | 0 | 10.5 | 0 |
| Struktol 3604 | 0 | 10.0 | 13.2 |
| Cardura E10 | 1.0 | 1.0 | 1.1 |
| Colorants | 0.3 | 0.3 | 0.4 |
| Sylquest Silane A187 | 0.7 | 0.7 | 0.7 |
| Amicure CG-1200 | 3.8 | 3.8 | 3.4 |
| EP796 | 0.7 | 0.7 | 0.8 |
| Wetting agent | 0.3 | 0.3 | 0 |
| Talc | 0.8 | 0.8 | 0 |
| Nyad 400 | 2.2 | 2.2 | 0 |
| Calcium Oxide | 0.5 | 0.5 | 0 |
| Calcium Carbonate | 12.0 | 12.0 | 13.7 |
| Microthene FE53200 | 0 | 0 | 1.9 |
| Fumed Silica | 5.2 | 5.2 | 5.5 |
| % Rubber | 9.5 | 10 | 11 |

Results from the foregoing testing are as follows:

| | Example or Comparative Sample No. | | |
|---|---|---|---|
| | 7 | 8 | C-4* |
| Lap Shear Strength (MPa), 1.6 mm substrate | 19.5 | 21.6 | 20.7 |
| Impact Peel Strength (N/mm), 0.8 mm substrate | 19 | 33 | 24 |

*Not an example of the invention.

EXAMPLES 9 AND COMPARATIVE EXAMPLE C-5

Structural adhesive Example 9 and Comparative Sample C-5 are prepared and tested in the same manner as described for Examples 1 and 2. The components used to make these adhesives are forth in Table 5.

TABLE 5

| Components | Parts By Weight Example or Comparative Sample No. | |
|---|---|---|
|  | 9 | C-5* |
| MX156 Core-Shell Rubber Dispersion | 18.33 | 0 |
| DER ™ 330 Epoxy Resin | 41.04 | 47.92 |
| Struktol 3604/3614 50:50 blend | 0 | 11.45 |
| RAM 965 | 17.3 | 17.3 |
| Cardura E10 | 1.14 | 1.14 |
| Colorants | 0.37 | 0.37 |
| Sylquest Silane A187 | 0.68 | 0.68 |
| Amicure CG-1200 | 4.87 | 4.87 |
| EP796 | 0.75 | 0.75 |
| Calcium Oxide | 3.61 | 3.61 |
| Calcium Carbonate | 3.61 | 3.61 |
| Fumed Silica | 5.51 | 5.51 |
| % Total Rubber | 4.6% | 4.6% |

Results from the foregoing testing are as follows:

| | Example or Comparative Sample No. | |
|---|---|---|
| | 9 | C-5* |
| Young's modulus (MPa) | 1800 | 1500 |
| Tensile Strength (MPa) | 39 | 32 |
| Elongation (%) | 11 | 9 |
| Lap Shear Strength (MPa), 1.5 mm CRS | 332.4 | 33.7 |
| Impact peel strength, 23° C. (N/mm), 1.0 mm CRS[1] | 48 | 45 |

*Not an example of the invention.
[1]CRS is cold rolled steel.

This data shows similar results as before. Replacement of the liquid rubber with a core-shell rubber leads to a significant improvement in modulus and tensile strength with no loss in elongation. Adhesive properties are not changed significantly, although some loss of impact peel strength at −40 C is seen on cold rolled steel.

What is claimed is:
1. A method comprising applying a structural adhesive to the surfaces of two metals, and curing the structural adhesive at a temperature of from 140 to 200° C. to form an adhesive bond between the two metals wherein the structural adhesive comprises:
- A) at least 10 weight percent up to about 20 weight percent, based on the weight of the adhesive, of one or more liquid rubber-modified epoxy resins, wherein the liquid rubber is a carboxyl-terminated butadiene/acrylonitrile copolymer and the epoxy resin is a glycidyl ether of a bisphenol;
- B) from 3 to 8 weight percent, based on the weight of the adhesive, of at least one core-shell rubber in the form of particles having at least one rubbery core portion and at least one shell portion that has a $T_g$ of at least 50° C., the rubbery core constituting from 50 to 95% of the weight of the core-shell rubber particles;
- C) from 12 to 30 weight percent, based on the weight of the adhesive, of a reactive toughener which is an isocyanate-terminated prepolymer formed from a polyether polyol and an aliphatic polyisocyanate in which the terminal isocyanate groups are blocked with a phenol, aminophenol, polyphenol or an allyl phenol;
- D) at least one non-rubber-modified epoxy resin which is a diglycidyl ether of bisphenol A, bisphenol F, bisphenol K or tetramethylbiphenol; and
- E) a guanidine curing agent, wherein the structural adhesive has a total rubber content of from 8 to 15% by weight.

2. The method of claim 1 wherein at least one of the metals is a hot dip zinc coated steel.

3. The method of claim 2 wherein at least one of the metals is a zinc/iron coated steel (galveneal).

4. The method of claim 1 wherein the liquid rubber-modified epoxy resin is a liquid butadiene-acrylonitrile rubber-modified epoxy resin wherein at least a portion of the liquid rubber has a glass transition temperature especially −50° C. or lower.

* * * * *